United States Patent [19]

Reddy et al.

[11] Patent Number: 5,034,126
[45] Date of Patent: Jul. 23, 1991

[54] COUNTER CURRENT DUAL-FLOW SPIRAL WOUND DUAL-PIPE MEMBRANE SEPARATION

[75] Inventors: Damoder Reddy, San Ramon, Calif.; Tag Y. Moon, Worthington, Ohio; Charles E. Reineke, deceased, lat of Midland, Mich., by Marian F. Reinecke, legal representative

[73] Assignee: The Dow Chemical Company, Midland, Mich.

[21] Appl. No.: 534,755

[22] Filed: Jun. 7, 1990

Related U.S. Application Data

[63] Continuation-in-part of Ser. No. 471,539, Jan. 29, 1990.

[51] Int. Cl.$^5$ ............................................. B01D 63/10
[52] U.S. Cl. .......................... 270/321.74; 210/321.83
[58] Field of Search ........... 210/321.6, 321.72, 321.74, 210/321.83, 321.76, 321.85

[56] References Cited

U.S. PATENT DOCUMENTS

| | | | |
|---|---|---|---|
| 3,367,504 | 2/1968 | Westmoreland | 210/321 |
| 3,397,790 | 8/1968 | Newby | 210/321 |
| 3,417,878 | 12/1968 | Bray | 210/321 |
| 3,668,837 | 6/1972 | Gross | 55/158 |
| 3,872,014 | 3/1975 | Schell | 210/32 |
| 3,874,986 | 4/1975 | Browall | 161/160 |
| 3,962,095 | 6/1976 | Luppi | 210/321 |
| 4,033,878 | 7/1977 | Foreman | 210/321 |
| 4,134,742 | 1/1979 | Schell | |
| 4,293,378 | 11/1981 | Klein | |
| 4,299,702 | 10/1981 | Bairinji | 210/433.2 |
| 4,301,013 | 10/1981 | Setti | 210/637 |
| 4,545,862 | 11/1965 | Gore | 203/10 |
| 4,548,714 | 11/1985 | Kirwan | 210/232 |
| 4,746,430 | 5/1988 | Cooley | 210/321.85 |
| 4,765,893 | 8/1988 | Kohlheb | 210/315 |
| 4,814,079 | 3/1989 | Schneider | 210/321.83 |
| 4,814,082 | 3/1989 | Wrasidlo | 210/490 |

Primary Examiner—Frank Sever

[57] ABSTRACT

The present invention relates to an improved design for a spiral wound membrane separation device. The improved module has one feed pipe separated into compartments which are connected axially to a porous spacer surrounded by a membrane envelope. A separate permeate pipe is immediately adjacent and generally in a parallel configuration to the fluid feed pipe and is in fluid communication with a different porous spacer sheet. When the porous feed membrane and pipe and spacer and permeate pipe are combined using appropriate complementary shaped spaced filling means, a spiral wound membrane separation device is obtained having two centrally located pipes. In one aspect, the membrane separation module further includes means for the addition of a countercurrent or cocurrent sweep fluid (gas) the permeate.

16 Claims, 9 Drawing Sheets

COUNTER CURRENT DUAL-FLOW SPIRAL WOUND DUAL-PIPE MEMBRANE SEPARATION

BACKGROUND OF THE INVENTION

This is a continuation-in-part of U.S. Ser. No. 07/471,539, filed Jan. 29, 1990, now pending.

FIELD OF THE INVENTION

The present invention relates to an improved design for a spiral wound membrane separation module or device. The module has two centrally located pipes—a feed pipe and a permeate pipe. The feed pipe is separated into compartments which are connected axially to a porous spacer, and the feed spacer is surrounded by a permselective membrane envelope. A separate permeate pipe is located adjacent to and generally parallel to the feed pipe and is in fluid communication with a different porous permeate spacer sheet. When the semipermeable membrane, porous feed spacer and feed pipe, and permeate spacer sheet and permeate pipe are combined by spiral winding using adhesive and appropriately shaped space filling means located adjacent to both pipes, the spiral wound module is obtained. In one aspect, the module further includes entrance and exit means for a countercurrent or cocurrent sweep fluid (gas) through the permeate passageway.

DESCRIPTION OF RELATED ART

Most common, commercial spiral-wound devices, especially in reverse osmosis desalination applications, are based on aspects as described by J. Westmoreland in U.S. Pat. No. 3,367,504, and D. T. Bray in U.S. Pat. No. 3,417,870.

Additional art of interest includes the following U.S. Patents:

R. L. Gross, U.S. Pat. No. 3,668,837; W. R. Browall, et al., U.S. Pat. No. 3,874,986; L. Luppi, U.S. Pat. No. 3,962,095; G. A. Newby, U.S. Pat. No. 3,397,790; G. E. Foreman et al., U.S. Pat. No. 4,033,878; W. J. Schell, U.S. Pat. No. 4,134,742; M. Klein, U.S. Pat. No. 4,293,378; R. Bairinji et al., U.S. Pat. No. 4,299,702; D. Setti et al., U.S. Pat. No. 4,301,013; W. F. Gore et al., U.S. Pat. No. 4,545,862; J. R. Kirwan, Jr. et al., U.S. Pat. No. 4,548,7114; T. E. Cooley, U.S. Pat. No. 4,746,430; R. Kohlheb, U.S. Pat. No. 4,765,893; B. M. Schneider, U.S. Pat. No. 4,814,079; and W. J. Wrasidlo, U.S. Pat. No. 4,814,082.

All of the references, citations, standards, patents cited in this application are incorporated by reference in their entirety.

Additional spiral-wound membrane separation devices of the art are described hereinbelow as FIGS. 1, 2 and 3.

In the membrane separation of fluids, in addition to the fluid feed, it is recognized as a problem that a countercurrent carrier fluid may be needed. For example, in the case of dehydration of gases, such as air or natural gas, a portion of product gas may be recycled as a carrier gas in the permeate passageway. However, no such configuration is described in the art.

The following three features require special consideration in designing such a countercurrent module or device:

1. Clearly defined, additional inlet and outlet for the carrier or sweep fluid are required.
2. The feed passageway on one side of the membrane, and the permeate passageway on the other side of the membrane are designed to produce maximum contact of the fee and permeate fluids with these two surfaces of the membrane.
3. The carrier fluid preferably flows countercurrent relative to the feed fluid.

None of the modules of the known art describe a module having a specific countercurrent or cocurrent fluid in the permeate fluid passageway to facilitate in the removal of the permeate or to remove additional undesirable components from the permeate. The designs of the present invention provide such a spiral wound module and a passageway in the permeate region for a countercurrent or cocurrent fluid (or sweep gas). It also provides a method to dry liquids or gases and/or to remove undesirable components from a fluid feed.

SUMMARY OF THE INVENTION

The present invention relates to a spiral wound membrane module having a permselective semipermeable membrane for use in the separation of a permeate from a fluid feed mixture, the module comprising:

a centrally located feed pipe, at least one permselective membrane envelope, having within the fold at least one feed spacer means for controlling the feed flow in the feed passageway, a centrally located permeate pipe which is generally parallel to the feed pipe, at least one permeate spacer means for controlling the permeate flow in the permeate passageway and optionally for controlling the flow of a countercurrent or cocurrent fluid in the permeate, and first and second volume space filling means for obtaining a substantially circular outer surface of the module, wherein the generally hollow feed pipe has a wall barrier intermediate in its length dividing the pipe into a first compartment and a second compartment, the feed pipe having means for introducing a fluid feed stream to the first compartment of the pipe and means for removing the more concentrated (feed) effluent fluid from the second compartment of the pipe, the first and second feed pipe compartments each having at least one axial opening through the pipe circumference through which the feed fluid will pass, the porous feed spacer means are in fluid communication with the axial openings of the first and second feed pipe compartments, the membrane envelope comprises a sheet membrane having a first surface and a second surface which is opposite to the first surface, wherein the membrane is generally folded once around the hollow feed pipe at the fold so that a first half of the first surface of the membrane layer faces the other half of the first surface of the membrane envelope creating a feed passageway and interposed between the first half and the other half of the first surface of the membrane is the porous fluid feed spacer means for controlling the flow of fluid in the feed passageway, the permeate passageway for the fluid permeate is formed by the adjacent second membrane surfaces which are opposite to the first membrane surface, wherein the permeate passageway has porous permeate spacer means which control the flow of fluid in the permeate passageway and, if present, also control the flow of a countercurrent or cocurrent fluid in the permeate passageway between the adjacent second membrane envelope surfaces which are opposite to the first membrane surface, the generally hollow permeate pipe is in the permeate passageway adjacent to and generally parallel with the feed pipe, the permeate pipe having a wall barrier intermediate in its length dividing the permeate pipe into a first permeate compartment and a second permeate compartment, the permeate pipe having means for removing the permeate from the first and second permeate compartments, where the first and second permeate pipe compartments each have at least one axial opening through the permeate pipe circumference through which the permeate fluid passes, and the permeate passageway is in fluid communication with the axial fluid openings of the first and second permeate pipe compartments, first volume space filling means (52A) to obtain a generally circular shape, for the module, which is adjacent to and in contact with the curved longitudinal outer surface of up to about one wrapping of the porous feed spacer means (55) about the feed pipe and also in contact with the outer surface of about one layer of the porous permeate spacer means about the permeate pipe, second volume space filling means (52B) adjacent to and in contact with about one wrapping of the permeate spacer means (58) about the permeate pipe (51B) and in contact with the outer surface of about one layer of the porous spacer means about the feed pipe (51A) wherein both volume space filling means each have an outer larger generally arcuate convex surface wherein the larger surface arc is slightly larger in diameter than the sum of the diameters of the feed pipe and the permeate pipe, and a smaller first and a smaller second inner concave intersecting arcuate surfaces which intersect each other and intersect the outer edge of the larger arc to define a linear shaped three dimensional volume having three curved face surfaces and two generally perpendicular end surfaces, wherein the smaller inner arcuate surfaces are about the same diameter and shape of the feed pipe and permeate pipe and the two inner concave surfaces of the space filling means are in contact with the adjacent convex outer surface of the porous feed spacer means about the feed pipe and the convex outer surface of the porous permeate spacer means surrounding the permeate pipe, wherein the first and second volume space filling means, when placed in contact with the porous spacer means surrounding the feed pipe and the porous spacer means about the permeate pipe, together form a substantially circular outer surface about which the pendant feed membrane and pendant permeate spacer means are spirally wrapped in alternating layers, means to seal the edges of the membranes of the module to contain the fluids therein, and means for removal of permeate fluid from the fluid permeate passageway to the exterior of the module, and means for restraining the unspiraling of the compact module roll under operational conditions.

In a preferred embodiment, the module is contained in a hollow casing having means to inject, collect and to remove the fluid feed and permeate from the casing.

In a preferred embodiment, wherein the hollow permeate pipe further includes means for injecting countercurrent or cocurrent fluid (or sweep gas or carrier gas) in one compartment of the permeate pipe, and means for removing the countercurrent fluid from the other compartment of the permeate pipe.

In a more preferred embodiment, the membranes for the module ar all sealed at the outer edges to contain all fluids within the module passageways.

In one embodiment, the feed passageway further comprises two juxtapositioned interconnected regions A–B wherein the outer region A and outer region B are each in fluid communication on one edge to the feed pipe axial openings and a second axial side of region A and a second axial side of region B are each in fluid connection to opposing sides of a generally located barrier (glue line) C, which separates region A and region B immediately adjacent to and sealed to the feed pipe, wherein region A axially receives the incoming fluid feed which is in fluid communication with region B at interconnecting open region D of the spacer, which open region D is at a location remote to the feed pipe.

In another embodiment, the permeate passageway comprises two juxtapositioned interconnected regions E–F–G wherein outer region E and outer region G are each in fluid communication on one edge to the permeate pipe axial openings, and a second axial side of region E and a second axial side of region G are each in contact with opposite sides of a generally centrally located barrier (glue line) H, which separates region E and region G immediately adjacent to and sealed to the permeate pipe wherein region E axially receives the incoming countercurrent fluid which is in fluid communication with region G at open region F of the permeate spacer, where region F is at a location remote to the permeate pipe.

In one embodiment, the permeate spacer means comprise three juxtapositioned interconnected regions J-K-L wherein the outer higher porous region J and outer higher porous region L are each in fluid communication on one edge to the pipe axial openings and a second axial side of region J and a second axial side of region L are each connected to opposing sides of lower porosity region K, wherein region J axially receives from the pipe the incoming countercurrent fluid at low pressure which is in fluid communication with the high pressure region K which is in fluid communication with lower pressure region L wherein region K is not directly in fluid communication with any axial opening of the first or second compartments of the pipe.

In another embodiment, differential fluid flow in the fluid feed passageway and in the fluid permeate passageway, e.g. regions Q, R, and S, are produced using multiple adhesive (glue) spots which are in a generally axial configuration to the pipe wherein the glue spots have a predetermined size and spacing from one another for the purpose of controlling the flow of fluid in the permeate passageway.

In another aspect, the present invention relates to a membrane separation device, which device comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral wound module and the interior wall of the housing, the spiral-wound membrane module being designed to separate the fluid feed stream into a permeate stream and a concentrate stream, (c) means to completely seal the annular clearance space between the exterior surface of the module and the interior surface of the housing creating a first chamber and a second chamber, (d) means to introduce a feed stream to the spiral-wound membrane module in the first chamber and means to withdraw a concentrated feed stream from the second chamber, and (e) means to withdraw a permeate stream, wherein the spiral wound membrane module comprises:

a centrally located feed pipe, at least one permselective membrane envelope, having within the fold at least one feed spacer means for controlling the feed flow in the feed passageway, a centrally located permeate pipe which is generally parallel to the feed pipe, at least one permeate spacer means for controlling the permeate flow in the permeate passageway and optionally for controlling the flow of a countercurrent or cocurrent fluid in the permeate passageway, and first and second volume space filling means for obtaining a substantially circular outer surface of the module, wherein the generally hollow feed pipe has a wall barrier intermediate in its length dividing the pipe into a first compartment and a second compartment, the feed pipe having means for introducing a fluid feed stream to the first compartment of the pipe and means for removing the more concentrated (feed) effluent fluid from the second compartment of the pipe, the first and second feed pipe compartments each having at least one axial opening through the pipe circumference through which the feed fluid will pass, the porous feed spacer means are in fluid communication with the axial openings of the first and second feed pipe compartments, the membrane envelope comprises a sheet membrane having a first surface and a second surface which is opposite to the first surface, wherein the membrane is generally folded once around the hollow feed pipe at the fold so that a first half of the first surface of the membrane layer faces the other half of the first surface of the membrane envelope creating a feed passageway and interposed between half and the first surface and the other half of the first surface of the membrane is the porous fluid feed spacer means for controlling the flow of fluid in the feed passageway, the permeate passageway for the fluid permeate is formed by the adjacent second membrane surfaces which are opposite to the first membrane surface, wherein the permeate passageway has porous permeate spacer means which control the flow of fluid in the permeate passageway and, if present, the flow of a countercurrent or cocurrent fluid in the permeate passageway between the adjacent second membrane envelope surfaces which are opposite to the first membrane surface, the generally hollow permeate pipe is part of the permeate passageway adjacent to and generally parallel with the feed pipe, the permeate pipe having a wall barrier intermediate in its length dividing the permeate pipe into a first permeate compartment and a second permeate compartment, the permeate pipe having means for removing the permeate from the first and second permeate compartments, where the first and second permeate pipe compartments each have at least one axial opening through the permeate pipe circumference through which the permeate fluid passes, and the permeate passageway is in fluid communication with the axial fluid openings of the first and second permeate pipe compartments, first volume space filling means (52A) to obtain a generally circular shape for the module, which is adjacent to and in contact with the curved longitudinal outer surface of up to about one wrapping of the porous feed spacer means (55) about the feed pipe and also in contact with the outer surface of about one layer of the porous permeate spacer means about the permeate pipe, second volume space filling means (52B) adjacent to and in contact with about one wrapping of the permeate spacer means (58) about the permeate pipe (51B) and in contact with the outer surface of about one layer of the porous spacer means about the feed pipe (51A), wherein both volume space filling means each have an outer larger generally arcuate convex surface wherein the larger surface arc is slightly larger in diameter than the sum of the diameters of the feed pipe and the permeate pipe, and a smaller first and a smaller second inner concave intersecting arcuate surfaces which intersect each other and intersect the outer edge of the larger arc to define a linear three dimensional volume having three curved surfaces and two generally perpendicular end surfaces, wherein the smaller inner arcuate surfaces are about the same diameter and shape of the feed pipe and permeate pipe and the two inner concave surfaces of the space filling means are in contact with the adjacent convex outer surface of the porous feed spacer means about the feed pipe, and the convex outer surface of the porous permeate spacer means surrounding the permeate pipe, wherein the first and second volume space filling means, when placed in contact with the porous spacer means surrounding the feed pipe and the porous spacer means about the permeate pipe, together form a substantially circular outer surface about which the pendant feed membrane and pendant permeate spacer means are spirally wrapped in alternating layers, means to seal the edges of the membranes of the module to contain the fluids therein, and means for removal of permeate fluid from the fluid permeate passageway to the exterior of the module, and means for restraining the unspiraling of the compact module roll under operational conditions.

In these embodiments, any of the modules may be constructed using multiples of membrane leaves and feed spacer and permeate spacer.

DETAILED DESCRIPTION OF THE INVENTION AND PREFERRED EMBODIMENT

Definitions:

As used herein:

"Axial flow" usually refers to a fluid flow entering/exiting a pipe and exiting/entering through an opening in the circumference of the pipe to a passageway at about a 90° angle.

"Countercurrent fluid" refers to a countercurrent fluid or "sweep gas". It is usually introduced at one end of the permeate pipe in a direction counter to the feed flow. The purpose of the sweep gas is to sweep the permeate passageway to facilitate the removal of the permeate. Using a crude natural gas (e.g. methane) feed, the crude natural gas feed will contain some water and/or carbon dioxide. Dry natural gas, e.g., methane as a countercurrent fluid introduced to the permeate passageway, will facilitate the removal of the water present in the permeate passageway.

"Cocurrent fluid" refers to a cocurrent fluid or "sweep gas". It is usually introduced at one end of the permeate pipe and flows in the same direction as the feed flow.

"Feed pipe" refers to the generally circular pipe through which the feed fluid enters the module and from which the more concentrated feed exits. The feed pipe usually has a solid barrier intermediate in its length and has at least one axial opening in the circumference before the barrier and at least one opening after the barrier.

"Membrane" refers to a thin membrane which is permselective for various fluids. The membrane may be homogeneous throughout. The membrane may also be asymmetric, i.e. one generally flat surface is more or less selectively permeable to the fluid than the second porous nonselective flat surface. It is also possible for the membrane to be porous on both flat surfaces, and the nonporous portion anywhere in the middle thickness of the membrane produces the permselective region.

"Permeate pipe" refers to the generally circular pipe from which the permeate exits from the module. The countercurrent fluid (sweep gas) is introduced in the permeate pipe in the opposite direction to the feed flow.

Separation devices of the existing art ar shown in FIGS. 1, 1A, 2, 2A, 3, and 3A herein.

Figure 1:
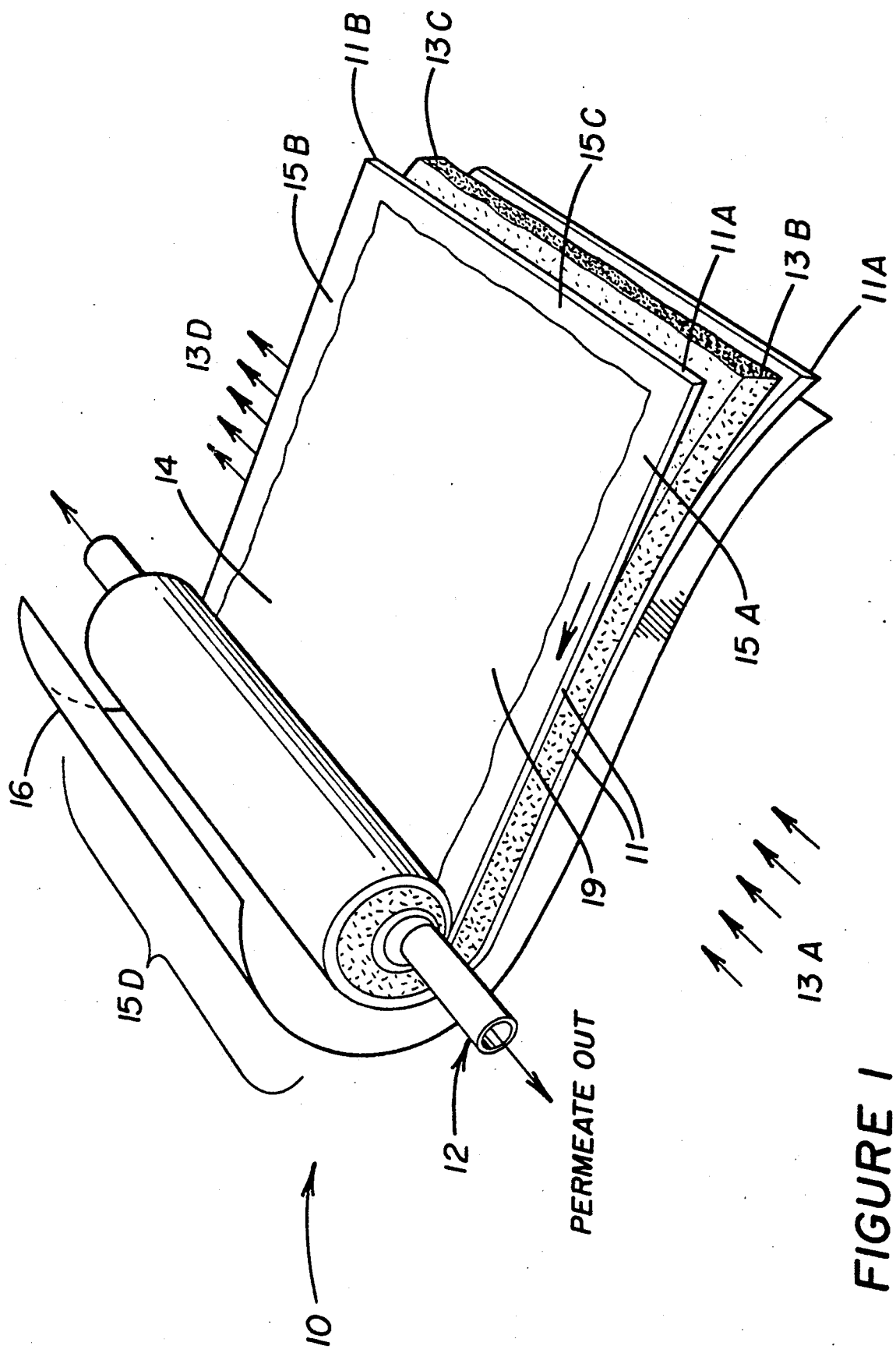
FIG. 1 is a breakaway perspective representation of one module of the art.

As seen in FIG. 1, device 10 of the art is formed of a piece of membrane 11 folded leaves 11A and 11B over a perforated tube 12 and forms a sandwich over a leaf of porous feed spacer material 13, e.g., VEXAR ® OR simplex. A membrane support sheet 14 is optionally provided. The permeate spacer 16 (e.g., simplex) is provided between the membrane surfaces and is in fluid communication with the core pipe 12 which has holes in its circumference.

The feed membrane sandwich 11A, 13 and 11B is adhesively sealed along both sides 15A and 15B and one end 15C as well as around the perforated central tube 12 where the tube meets the sandwich at area 15D.

The assembly 10 is then spirally rolled up by wrapping the leaf around the tube with the highly porous feed-side spacer screen 16 placed between the surfaces of the membrane.

The spiral wound module 10 can be used alone or can be placed in a hollow pressure vessel with proper seals and connectors.

The feed fluid 13A is forced through the annular screen spacer feed channel 13 from one end of the channel 13B and exits through the other end of the channel 13C as the concentrated feed 13D.

During the passage of the feed fluid in the axial direction, permeate species will pass through the membrane 11A and 11B into the permeate channel 19 and move spirally inward and through axial holes in the circumference of tube 12 and into the central tube 12, and exit at either end of the tube 12. Because of the adhesive seals, when a high pressure feed (100–2,000 psi) is used in this configuration without an enclosing high-pressure chamber, the adhesive seals often burst. The relative flow patterns of the feed and permeate are in a general countercurrent configuration.

Figure 2:
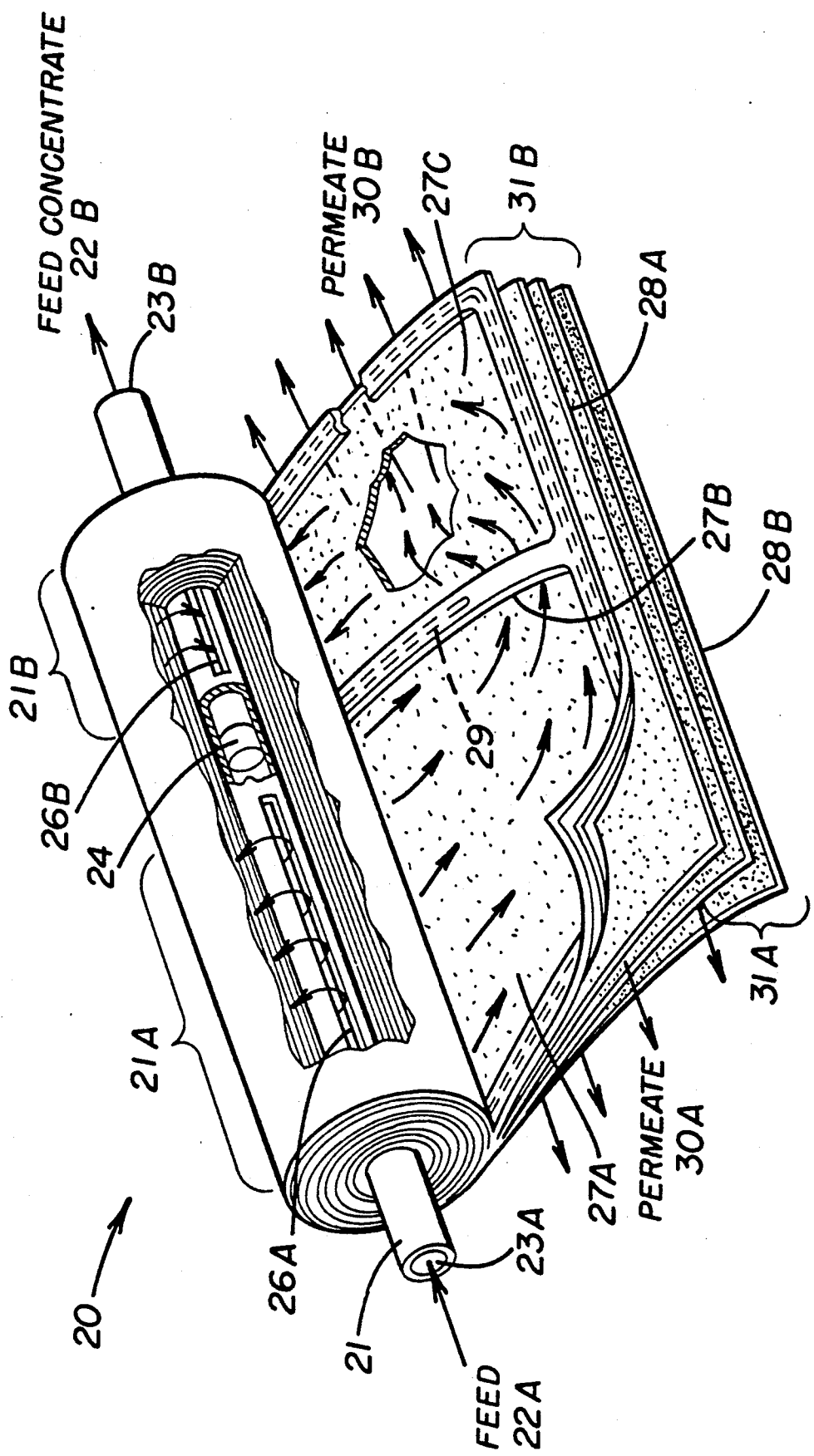
FIG. 2 is a cutaway perspective representative of another module of the art.

An alternative design is the so-called open-channel ultrafiltration device. The geometric relationship of the feed channel and the permeate channel is reversed. Shown in FIG. 2 is found the device 20 of the art. The feed 22A enters at one end 23A of the central pipe 21 which contains a solid plug 24 at some mid-point in the pipe, whereby the feed 22A passes through an opening(s) 26A in pipe 21 into the feed channel 27A which is sandwiched between two sheets of membrane 28A or 28B, and travels spirally outward away from the pipe. The feed channel 27 has a partial partition barrier 29 (glue line) located from the general location of the plug in the central tube so that the feed fluid 22A, upon reaching the end portion of the channel at open region 27B, is deflected into the channel space 27C on the other side of partial partition 29. The feed 22A then travels spirally inward toward pipe 21 through opening 26B into the portion of pipe 21B on the second side of the plug 24 and finally exists through the opposite end 23B of tube 21 as a more concentrated feed fluid 22B. The permeate 30A and 30B flows in the axial direction and leaves module 10 at both edges 31A and 31B of the module membrane surface.

Figure 3:
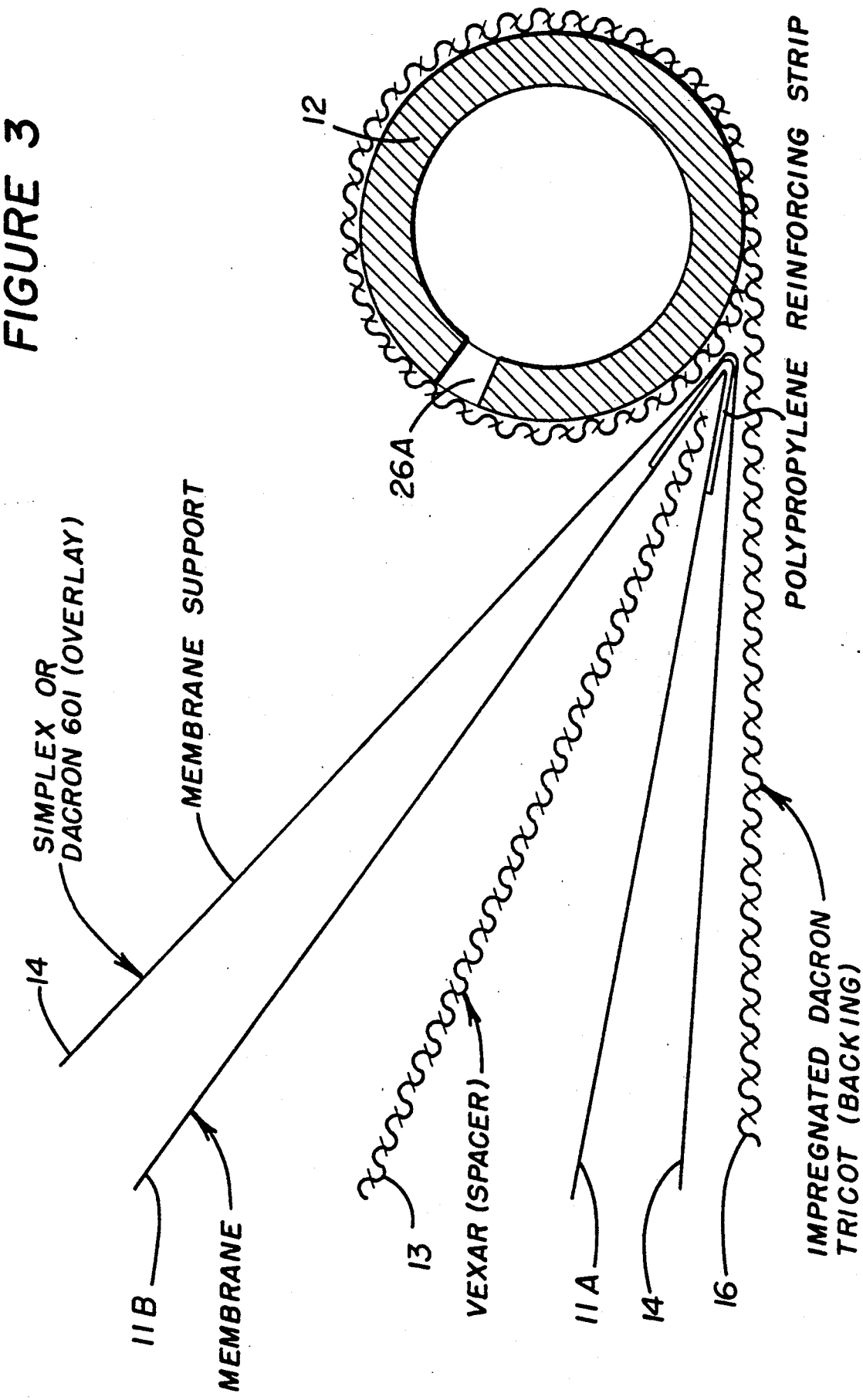
FIG. 3 is an end schematic representation of the module of FIG. 1.

FIG. 3 shows an end cross-sectional view of a single flow spiral-wound module of the art where the numbers designating the components of the module are the same as in FIG. 1.

Referring now to FIGS. 4, 4A, 4B, 4C, 5, 5A, 6, 7, and 8 of the present invention, the novel design accommodates the countercurrent or cocurrent fluid in the permeate channel.

Module 50 (FIG. 5, 6 7, and 8) contains two central pipes, the feed pipe 51A and the permeate (carrier or sweep gas) pipe 51B. Feed pipe 51A and permeate pipe 51B are each divided into two compartments by means of a solid plug 51C and 51D, respectively, in such a way that the relative length of the two segments corresponds generally to the ratio of feed to concentrate volume.

Figure 6:
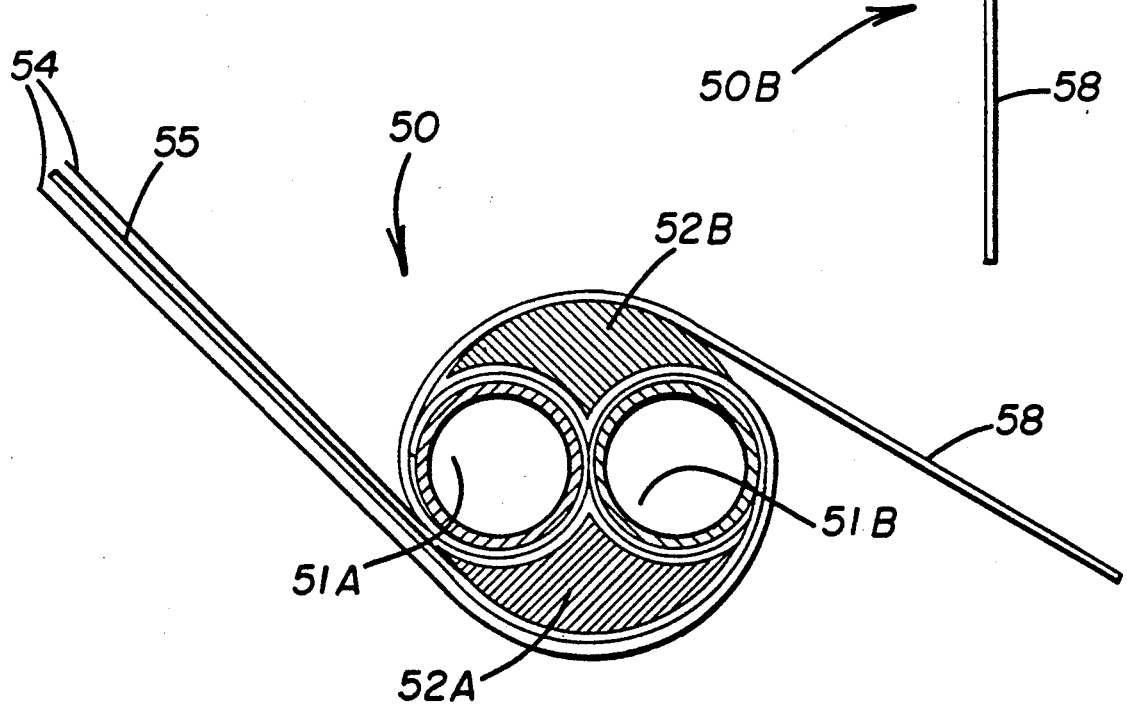
FIG. 6 is a cross-sectional view of the fitting aspects of the partially spiral wound module using the two pipes and two arcuate shaped space filling volume means.

Associated with each pipe 51A and 51B is a volume space filling means 52A and 52B shaped such that the two pipes 51A and 51B and the two volume space filling means 52A and 52B (sometimes referred to as block bars) which, when collectively assembled as shown in FIG. 6 produce a substantially circular cross-section about which the pendant membranes and/or spacers are spirally wound, assembled, and secured to produce module 50.

Figure 5:
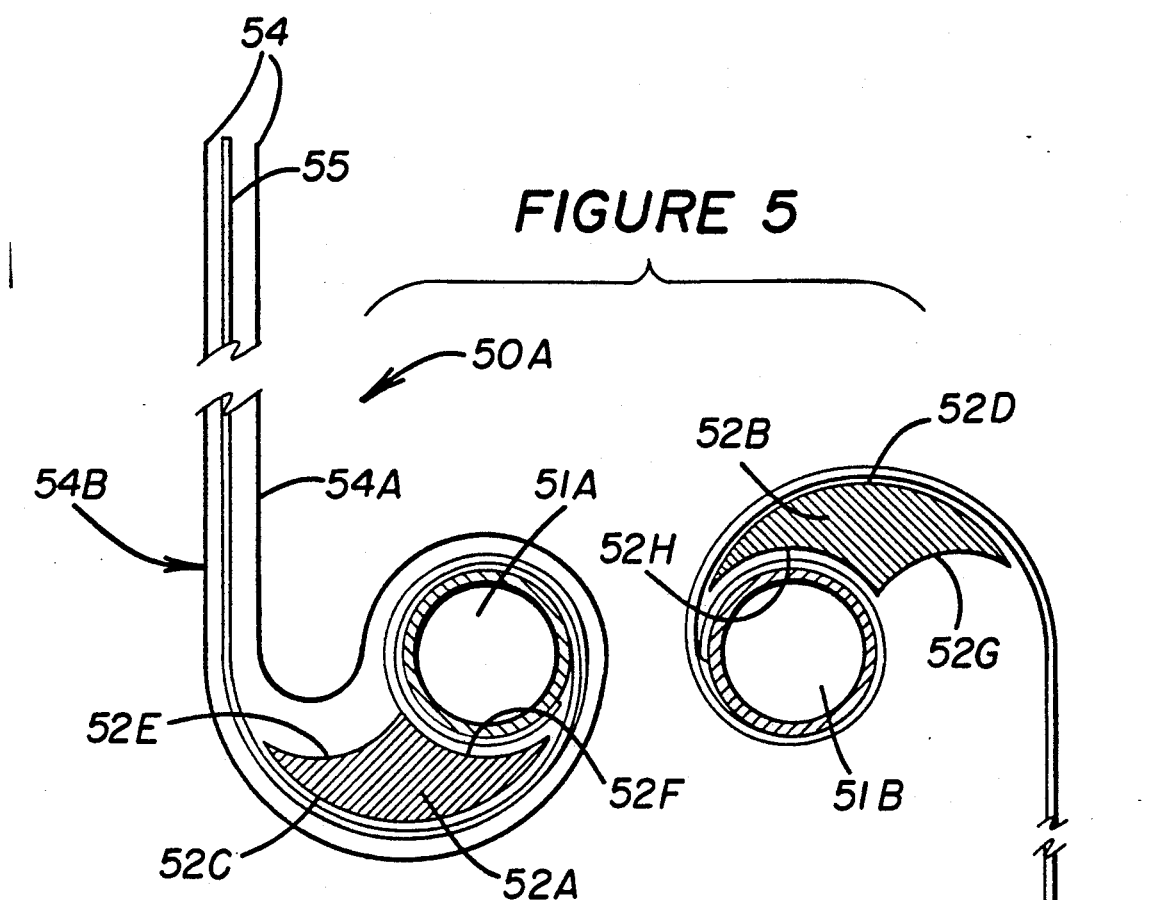
FIG. 5 is a cross-sectional end view of the module prior to spiral winding.

Feed Fluid Passageway—A piece of membrane 54 is folded to produce an envelope about the perforated feed pipe 51A (or a pipe having specifically drilled holes 56A and 56B) and the associated volume space filling means 52A into a leaf as shown in FIG. 5. The two halves of membrane 54A and 54B sandwich a piece of porous feed passageway (channel) spacer screen 55 which also wraps around the pipe 51A and volume space means 52A, as shown in FIG. 5. In one embodiment, a partial barrier means 57A (glue line) is made to provide maximum contact of the feed fluid with the membrane surface in the sandwiched spacer screen of the leaf. The glue line is sealed at the pipe 51A, and is sealingly extending from the central tube 51A about the location of the plug 51C to about the midpoint of the width of the membrane leaf 54 approximately one-half width to one-fourth width away from the end (remote to the pipe) of the membrane leaf 54.

The full-width spacer screen 55 in the feed passageway also may be obtained by multiple strips of variable porosity spacer grids at the three areas of the leaf membrane (FIG. 5B), as is also described in pending U.S. Ser. No. 471,539, which is incorporated herein by reference.

Permeate Passageway—A piece of porous spacer material 58, such as melamine-impregnated simplex, is wrapped around the perforated (holes 58A and 58B) in the permeate pipe 51B. The associated volume space filling means 52B are at one end of the spacer, the other end of the spacer extends approximately the same length and width of the feed passageway. The backing porous material 58 also has a partial barrier 57B at the location corresponding generally to the fluid barrier located in the feed channel spacer. Thus, both passageways (channels) are sealed at this barrier point to provide for maximum contact the feed fluid with the membrane surface and of the of permeate fluid with cocurrent or countercurrent fluid.

The means to introduce and remove the cocurrent or countercurrent fluid into/from the permeate passageway are at the open ends of the permeate pipe 51B. The addition of an inlet or outlet for this fluid can be an additional valve and fluid inlet/outlet to one or both ends of pipe 51B.

Figure 7:
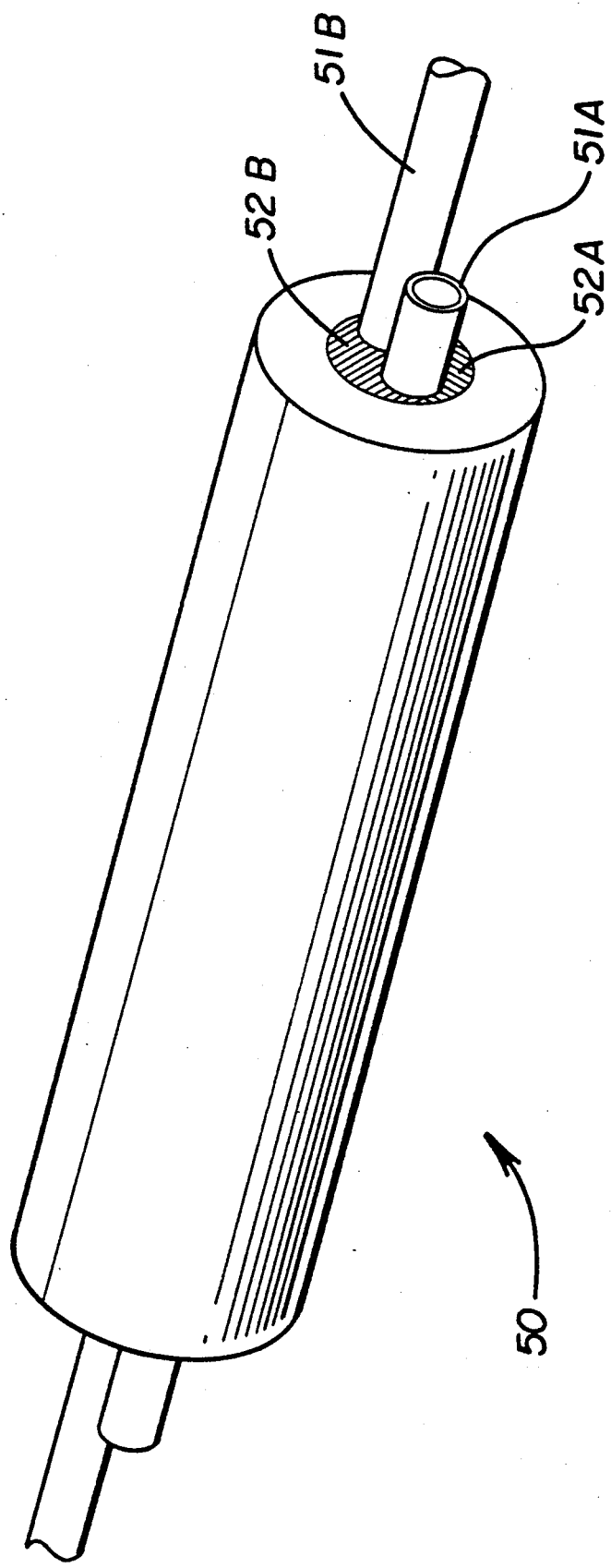
FIG. 7 is a perspective view of the spiral-wound module.

In FIG. 6, the two lay-up assemblies 50A and 50B are engaged with volume space filling means 52A and 52B to form a generally cylindrical core with the pendent membrane leaves. Membrane 54 of assembly 50A and permeate spacer 58 of assembly 50B are then spirally rolled by wrapping around the core unit 50A to produce cylindrical module 50 as shown in FIG. 7.

Volume Space Filling Means—The volume space filling means 52A and 52B are each shaped having a larger generally arcuate convex linear surface (52C and 52D) which is an arc having a diameter substantially the same as the sum of the diameters of the feed pipe and the permeate pipe and smaller first (52E, 52G) and smaller second (52F, 52H) inner concave intersecting arcuate surfaces. These three arcuate surfaces (52C, 52E, and 52F and 52D, 52G, and 52H) each define a separate linear three-dimensional volume having the three curved surfaces and two generally perpendicular ends.

These volume spaces filling means may be of any material e.g. metal, ceramic, polymeric, porous or non porous, so long as the material withstands the operational chemical, thermal and pressure conditions. The volume space filing means may be preformed by methods known in the art and placed in the proper position prior to spiral winding. A preferred method of creating the volume space filling means is to use a suitable fluid epoxy resin or a fluid polyurethane. A minimal amount of the fluid plastic is placed in the membrane spaces prior to spiral winding.

The membranes are then carefully spiral wound. The arcuate shape described above forms as a result of the spiral winding. The proper amount of fluid polymer is important. Too little plastic will leave voids for the membrane to collapse into and possibly rupture. Too much plastic may spread extensively onto the membrane surfaces and reduce their permeability. One of ordinary skill in the art may determine the appropriate amount of fluid plastic with a minimum of experimentation.

The open circular edges of the module membrane are contacted with an adhesive sealant 60 and capped. The surface of the module may be encased in the hollow non-permeable shell.

Module Operation—In one embodiment, the module is placed in a chamber capable of withstanding higher pressures of the order of about 1000 psi to 2000 psi.

Figure 8:
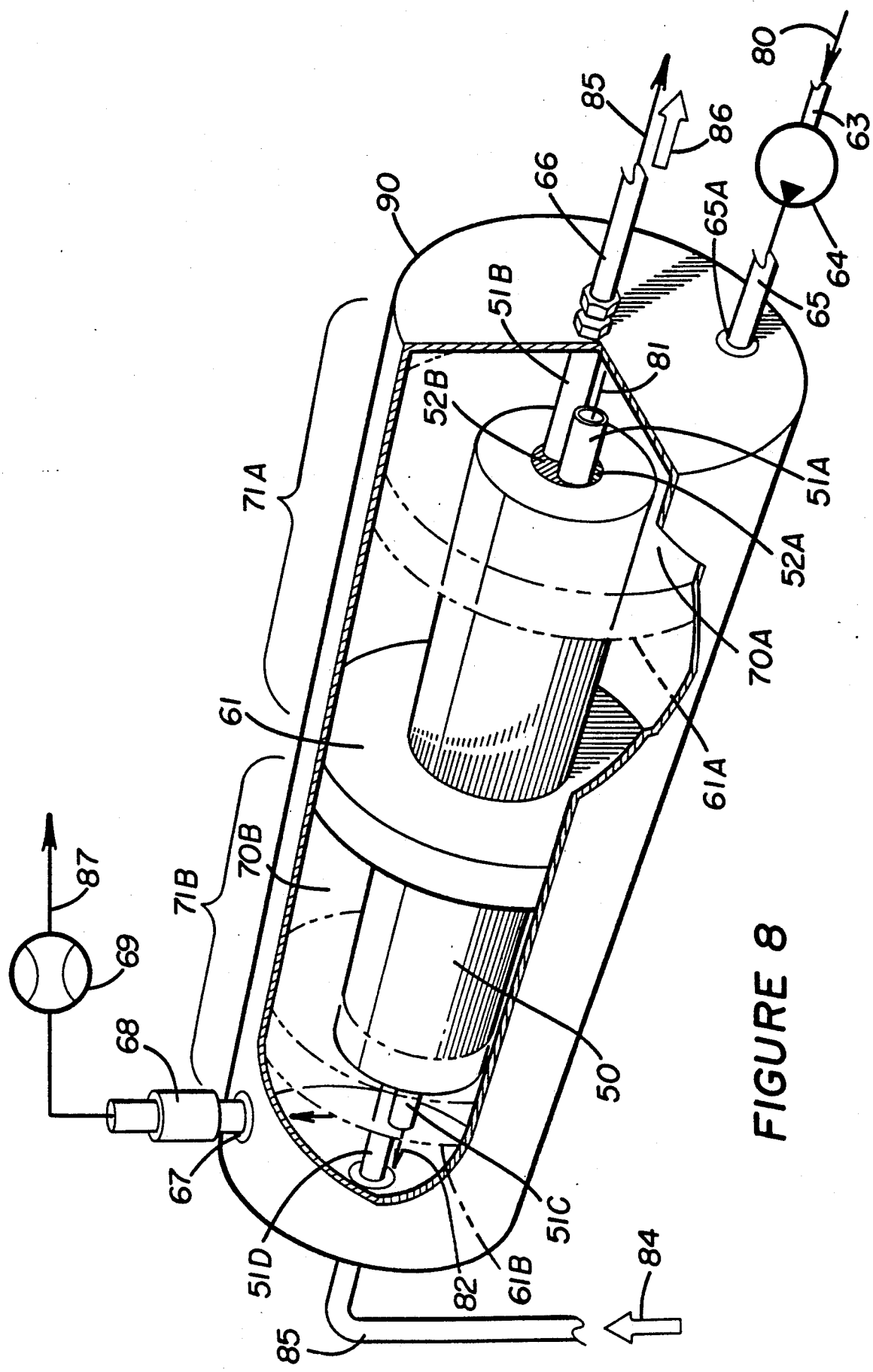
FIG. 8 is an isometric view of the spiral-wound module in a housing.

In FIG. 8, the feed stream 80 is introduced at line 63 to an optional pump 64 from which it is transported at an elevated pressure through exterior pipe 65 and a coupling opening 65A in housing 90 which surrounds spiral-wound module 50. As is seen in FIG. 8, housing 90 is divided into a first compartment 71A (or 70A) and a second compartment 71B (or 70B) by a solid barrier 61 situated at any number of points intermediate of the length of the module 50 (note the phantom outline of the barrier positions 61A and 61B). The feed stream 81 enters spiral-wound module 50 using pipe 51A. The fluid feed 81 is conveyed through the spiral-wound membrane. A portion of the components of the fluid feed will permeate through the membrane into the permeate passageway. The more concentrated feed stream 82 (less the permeate) exits the module at 51C and enters the second chamber 71B (or 70B) The feed stream 82 (purified and somewhat more concentrated) is removed through coupling 67 as the process feed effluent 87 via pipe 68.

Outlet pipe 68 optionally contains a throttling value 69 which controls the flow through velocity of the feed stream.

The fluid permeate is found in the permeate channel. The countercurrent gas 84 enters module 50 via pipe 85 which becomes pipe 51D. The permeate passageway in module 50 is then subjected to this carrier fluid 84 which carries the permeate and exits module 50 in line 51B and line 66 as permeate 85 and carrier gas 86.

Figure 4:
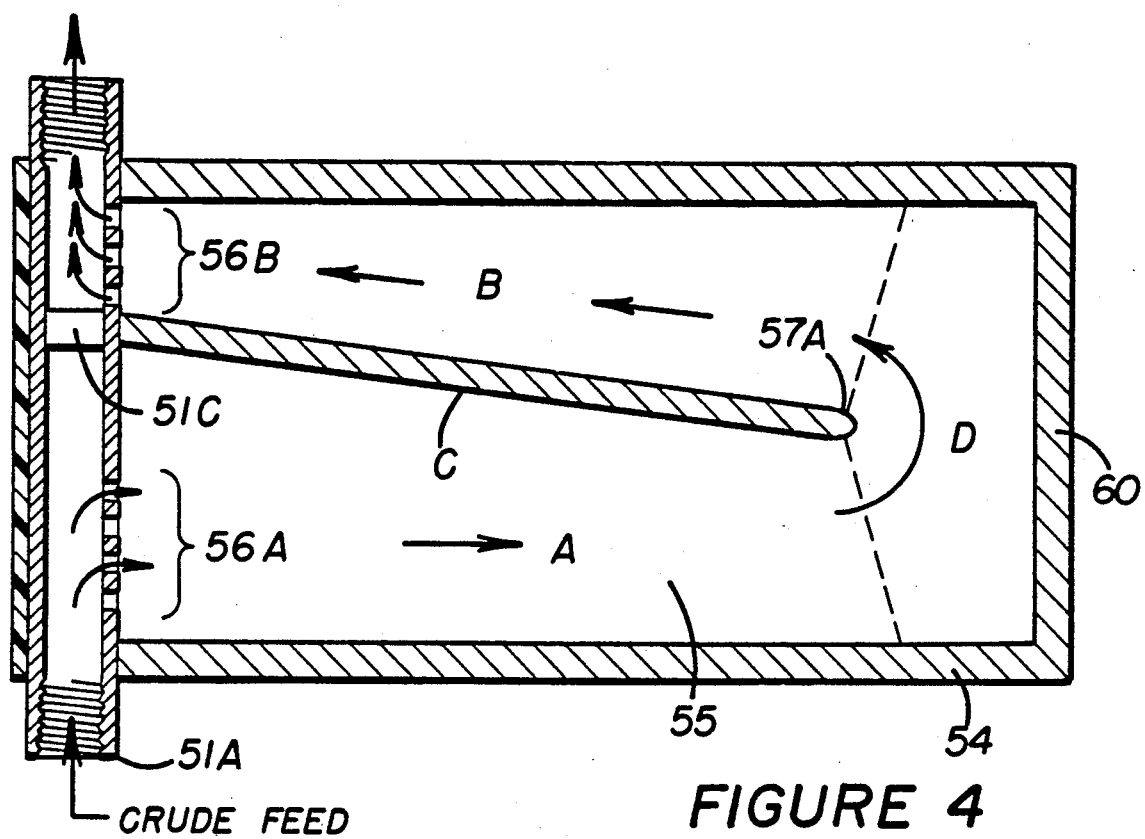
FIG. 4 is a cutaway schematic representation of an open layup of the pipe and feed fluid passageway of the present invention.
Figure 4A:
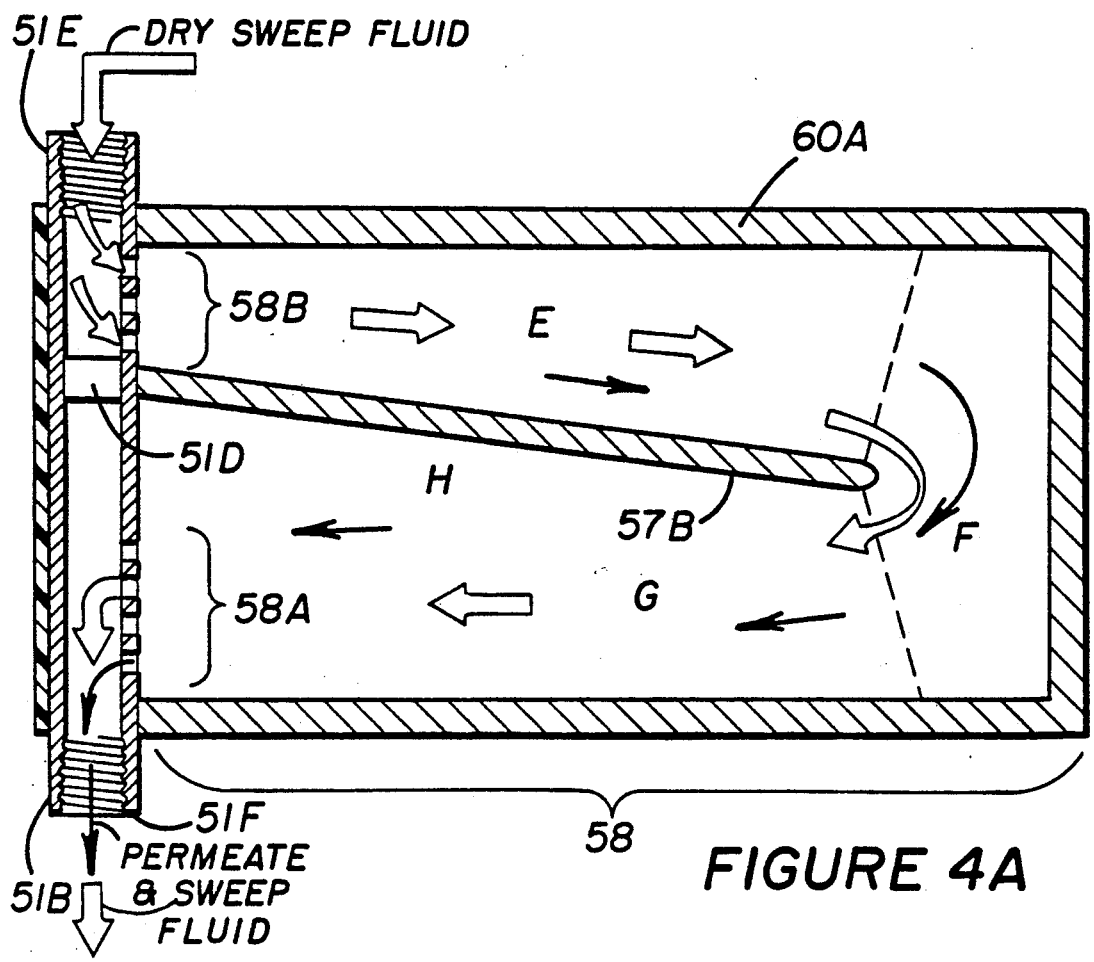
FIG. 4A is a cutaway schematic representation of the open layup of the pipe and the permeate (and countercurrent fluid) passageway of the present invention.

In FIG. 4A, the inlet 51C and outlet 51D of the permeate tube 51B are located at the opposite ends of those of the feed tube in order to achieve countercurrent flows of fluid and sweep gas.

This design of the present invention has several added advantages over the conventional spiral wound design of the art:

1. Because of the presence of the shaped volume space filling means 52A and 52B to produce in combination with the pipes an overall circular cross-section to spiral wind the membrane and spacer. This configuration also prevents creases or folds, the permselective membrane does not need to be sharply folded. Sharp folds and/or creases in the permselective membrane are known to be the cause of leakage in the spiral modules, and are thus avoided.

2. Simultaneous sealing (potting) of the edges of the membrane with permeate spacer while keeping the feed passageway (space) open during the rolling operation is eliminated. In a conventional spiral module, one of the passageways, either feed or permeate, must be open in the membrane at the ends of the cylindrical module, whereas the described design all of the ends of the membrane are totally sealed. The seals are under compression at higher pressures and do not burst when used in a pressure vessel (FIG. 8).

3. This design also eliminates the risk of "telescoping," namely the shearing of the core-tube with respect to the permeate-side due to pressure build up in feed channel caused by plugging or fouling.

The crude feed pipe 51A and/or the permeate pipe 51B can be independently metal, organic polymer, composite and the like. Suitable materials include, for example, commercially available copper, steel, aluminum, poly(carbonate), poly(amide), and the like. Copper or aluminum are preferred.

These pipes are usually about the same size in diameter and length. The diameter of the pipes is from about 0.25 in. outer diameter to about 4 in. outer diameter. Preferably, the diameter is between about 0.25 in. and 2 in. outer diameter.

The length of pipes 51A and 51B is really not limited and can be from a few inches to several feet. Generally, the length is between about 6 in. to about 5 ft.

The permselective membrane can be of any material which is selectively permeable to the fluid or species to be separated. These membranes can be, for example, cellulose triacetate, polyperfluorosulfonic acid (PFSA), polyamide, polyvinylalcohol, polysulfone, regenerated cellulose or the like. Membranes include, for example, PFSA (See U.S. Pat. No. 4,846,977 for methods of preparation) assigned to Dow Chemical Company, Midland, Mich. 48640, or NAFION ® film from DuPont Co. of Wilmington, Del., or cellulose triacetate KODA-CELL ®TA-404 from Eastman Kodak, Rochester, N.Y. The thickness can be any useful thickness, preferably between 0.1 and 100 mil, more preferably about 1–5 mil.

Membranes that are suitable for use in the present invention may be constructed of a fluoro-carbon-type material or of a hydrocarbon-type material. Such membrane materials are well-known in the art. Preferably, however, fluorocarbon materials are generally preferred because of their chemical stability.

Non-ionic (thermoplastic) forms of perfluorinated polymers described in the following patents are particularly suitable for use in the present invention because they are easily softened by heating and formed into useful membrane shapes. Membranes which are suitable are described in the following patents: 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; 4,478,695; and European Patent Application 0,027,009, all of which are specifically incorporated herein by reference. Such polymers usually have equivalent weight in the range of from about 500 to about 2000. The membranes can be of a single layer or they can be a multilayer membrane.

Particularly preferred fluorocarbon materials for use in forming membranes ar copolymers of monomer I with monomer II (as defined below). Optionally, a third type of monomer may be copolymerized with I and II.

The first type of monomer is represented by the general formula:

$$CF_2=CZZ' \qquad (I)$$

where:
Z and Z' are independently selected from the group consisting of —H, —Cl, —F, or —CF$_3$.

The second type of monomer consists of one or more monomers selected from compounds represented by the general formula:

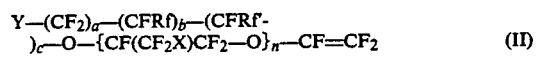

$$Y-(CF_2)_a-(CFRf)_b-(CFRf'-)_c-O-\{CF(CF_2X)CF_2-O\}_n-CF=CF_2 \qquad (II)$$

where:
Y is selected from the group consisting of —SO$_2$Z, —CN, —COZ, and C(R3f)(R4f)OH;

Z is —I, —Br, —Cl, —F, —OR, or —NR1R2;

R is a branched or linear alkyl radical having from 1 to about 10 carbon atoms or an aryl radical;

R3f and R4f are each independently selected from the group consisting of perfluoroalkyl radicals having from 1 to about 10 carbon atoms; R1 and R2 are independently selected from the group consisting of —H, a branched or linear alkyl radical having from 1 to about 10 carbon atoms or an aryl radical;

a is 0–6;
b is 0–6;
c is 0 or 1;
provided a+b+c is not equal to 0;
X is —Cl, —Br, —F, or mixtures thereof when n=1;
n is 0 to 6; and
Rf and Rf' are independently selected from the group consisting of —F, —Cl, perfluoroalkyl radicals having from 1 to about 10 carbon atoms and fluorochloroalkyl radicals having from 1 to about 10 carbon atoms.

Particularly preferred is when Y is —SO$_2$F or —COOCH$_3$; n is 0 or 1; Rf and Rf' are —F; X is —Cl or —F; and a+b +c is 2 or 3.

The third, and optional, monomer suitable is one or more monomers selected from the compounds represented by the general formula:

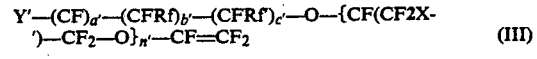

$$Y'-(CF)_{a'}-(CFRf)_{b'}-(CFRf')_{c'}-O-\{CF(CF_2X-)-CF_2-O\}_{n'}-CF=CF_2 \qquad (III)$$

where:
Y' is —F, —Cl or —Br;
a' and b' are independently 0–3;
O is 0 or 1;
provided a'+b'+c' is not equal to 0;
n' is 0–6;
Rf and Rf' are independently selected from the group consisting of —Br, —Cl, —F, perfluoroalkyl radicals having from about 1 to about 10 carbon atoms, and chloroperfluoroalkyl radicals having from 1 to about 10 carbon atoms; and X' is —F, —Cl, —Br, or mixtures thereof when n'=1.

Conversion of Y to ion exchange groups is well-known in the art and consists of reaction with an alkaline solution. The membrane may be converted to its ionic form by reacting it with, in the case of —$SO_2F$ pendant groups, 25 weight percent of NaOH under the following conditions:

1. immerse the film in about 25 weight percent sodium hydroxide for about 16 hours at a temperature of about 90° C; and 2. rinse the film twice in deionized water heated to about 90° C., using about 30 to about 60 minutes per rinse. The pendant group is then in the —$SO_3$—Na+ form. Cations other than —Na+ can be made to replace the Na+ if practical (such as —H+).

The feed or permeate spacer materials are generally porous loosely knit organic materials. These include, for example, VEXAR®, which is available from Conwed Corp., St. Paul, Minn. VEXAR® is useful as a permeate grid spacer at a pressure of up to about 30 psig. At high feed pressures (over 50 psig), the porous membrane usually collapses into the VEXAR®. At these higher pressures, SIMPLEX spacer available from Al DeCenso Fabrics, Annapolis, Md. 21401 is particularly useful as a permeate spacer.

The plug barriers 51C and 51D are independently selected from any materials which will seal the pipe into two compartments. Thus, for a copper or aluminum pipe, a copper or aluminum barrier may be soldered or welded in place. A polymeric material such as a polyurethane adhesive plug may be used. For the organic polymeric pipe, usually an organic adhesive sealant is used such as polyurethane, epoxide and the like. Dow Epoxy DER 410 or Fuller 3501 are particularly useful.

The adhesive sealant at the edges of the feed membrane is usually an organic adhesive, such as a commercially available polyurethane or epoxide, e.g. Fuller 3501 or Dow DER 410.

The barrier 57A and 57B provides maximum contact of the permeate and countercurrent fluid with the active membrane. The barrier (glue line) can be of polyurethane or an epoxide.

The module can be used at temperatures lower than 0° C for the separation of gases (e.g., $O_2/N_2$, low boiling FREON®S, etc.). The only limitation is when the low temperature causes the polymer to degrade or imbrittle. The upper operational temperatures must be below the glass transition temperature of the polymers and membranes, usually 10° C. lower or more.

The modules usual operate for air or natural gas dehydration at between about 0° C. and about 70° C. Ambient temperatures are preferred.

With any of the modules described herein, multiple leaf arrangements are contemplated. At least one permeate spacer-membrane-feed spacer-membrane arrangement is present.

Figure 4B:
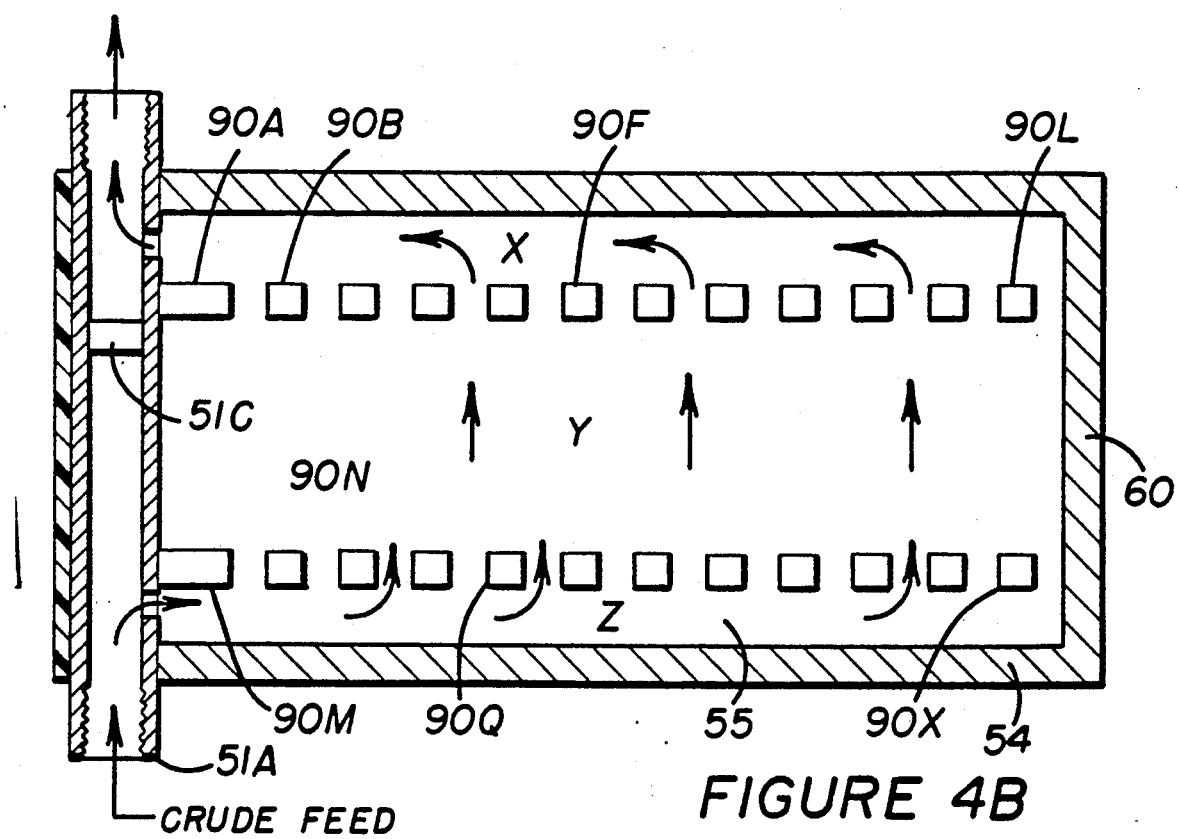
FIG. 4B is a schematic representation of an open layup of the pipe and the feed fluid passageway using glue spots t control the feed flow.
Figure 4C:
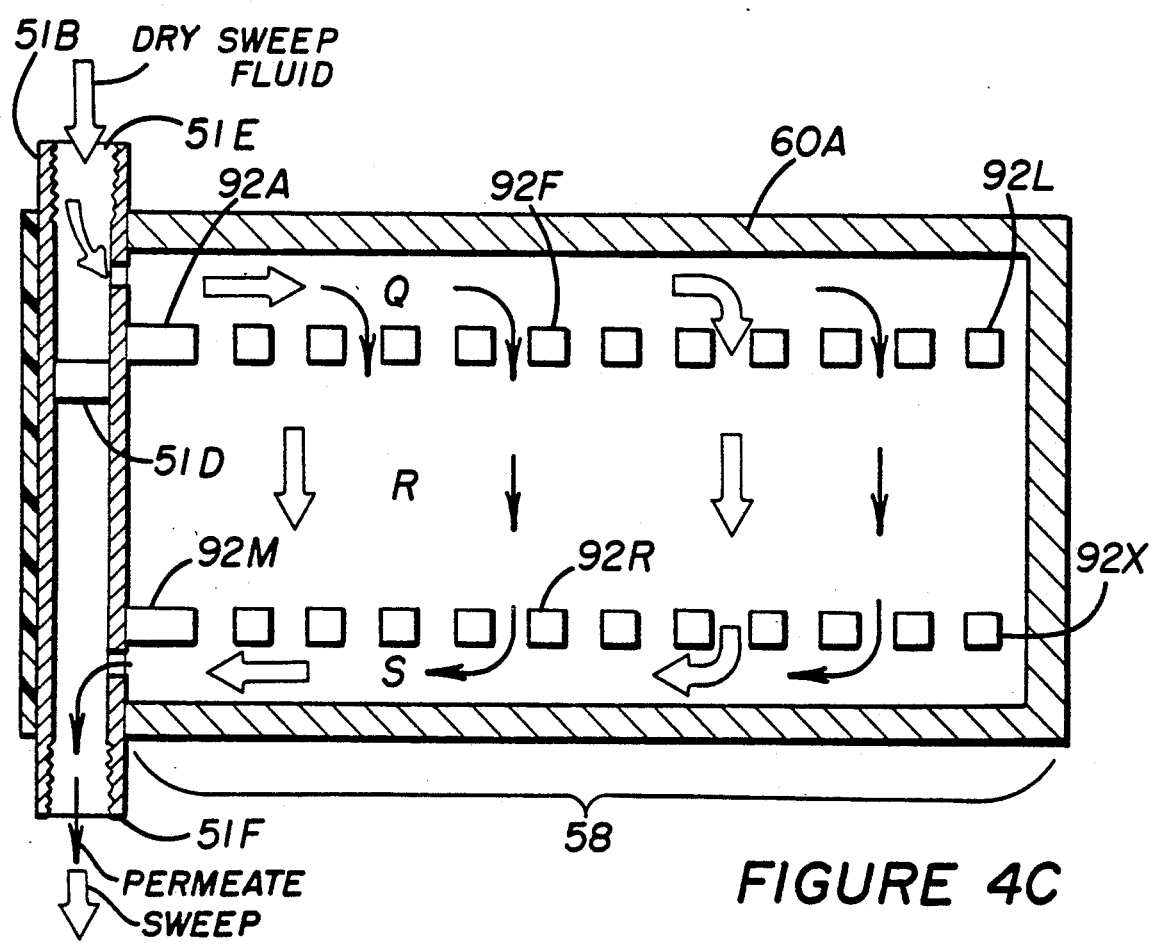
FIG. 4C is a schematic representation of an open layup of the pipe and the permeate (and countercurrent fluid) passageway using glue spots to control the permeate flow and countercurrent fluid flow.

Glue Spot Module—In another aspect as shown in FIGS. 4B and 4C, the present invention relates to a module which has the advantage of some continuous process of manufacture of its component layers. The fabrication is simple and uses fewer materials. In this embodiment, in FIG. 4B two sheets of the permselective membrane 54A and 54B are optionally separated by an open feed spacer grid 55. One sheet of membrane 54A is positioned first and the feed spacer 55 is placed on the top of the first membrane 54A Glue (adhesive) spots 90A to 90L and 90M to 90X are placed on spacer 55 at specific points. Membrane sheet 54B is placed on the adhesive spots. The specific spacing between the glue spots and their location provides the proper degree of desired control of the flow in a uniform manner in the feed passageway.

The two sets of adhesive tabs 90A to 90L and 90M to 90X do not need to be in parallel lines to each other or substantially the same in placement, spacing or configuration. The only requirement is that they provide control of the feed fluid to produce substantially uniform fluid flow across the active portions of the permselective membrane.

Similarly, in FIG. 4C the permeate passageway is formed by the opposite sides of the membrane surfaces which form the feed passageway. A spacer material (simplex) is inserted. Glue(adhesive) spots 92A to 92L and 92M to 92X are placed on the permeate spacer. The specific spacing between the glue spots 92A to 92L and 92M to 92X can be any distance or configuration. The important aspect is desired degree of control of the flow of the permeate and the flow of the countercurrent (or cocurrent) fluid through the permeate channel.

In one embodiment, first glue spots in the permeate channel of about 0.25×0.25 in. are placed in generally parallel lines axially to pipe 51B, and adjacent to the edge of the attached pipe about 3 inches in from the opposite edges of the permeate membrane 112 and 113. The second glue spots IIIB or lines are then placed 0.5 in. from the first two axially away from pipe 15. The third glue spots 111C are then placed 0.375 in. from the second ones. The glue spots are then continued in two generally parallel lines adding about 0.125 in. in spacing between adjacent glue spots.

The fluid separation obtained by these glue spot modules expected to be comparable to those described earlier using multiple and/or different density spacers.

The countercurrent fluid (open arrows) in FIG. 4C enters region Q and in the permeate passageway and is conveyed substantially uniformly across active membrane region R through the glue spots into region S and exits the module with the permeate.

FACILITATED TRANSPORT SPIRAL WOUND MEMBRANE

In another aspect, the present invention relates to removal of acid or basic gases from gaseous or liquid mixtures. Facilitated transport membranes are known, see, for example, J. D. Way et al. (1989), *Journal of Membrane Science*, Vol. 46, pp. 309-324. Facilitated transport refers to the use of a mobile complexation agent in a membrane to selectively increase the flux of one or more of the permeating species which react reversibly with the complexation agent or carriers. The reactive membranes when used in the present invention achieve both high permeability and high separation factors. Ion exchange resins may be used as a support for complexation agents. The carrier cannot easily be forced out of the support since the carrier is retained by strong electrostatic forces.

For example, a NAFION® or perfluorosulfonic acid (PFSA) polymer film can first be converted to the sodium salt and contacted with monopositive ions, such as monopositive ethylene diamine (HEDA+), to facilitated transport membranes. Any positively charged counter ion includes, for example $Ag^+$, $Li^+$, $Bu^{+2}$, $Ca^{+2}$, and the like. HEDA+ acts as a carrier for both carbon dioxide and hydrogen sulfide. Therefore, these materials can be removed from a natural gas mixture which includes species in addition to methane. Facilitated transport, in general, requires the sweep gas in the permeate passageway, therefore, the module of the present invention is particularly useful.

FIGS. 4 to 8 show the use of the sweep gas through the permeate passageway. The present invention makes it possible for the sweep gas to have maximum contact with the permeate. Usually the sweep gas is at a pressure of between about 0.01 and 50 psia, preferably between about 1 and 25 psia.

The microporous membrane support material is a commercial VESAPOR ® 3000H both available from Gelman, Ann Arbor, Mich. or a commercially available polysulfone. VEXAR ® is also available from Conwed Corp. Also see F. B. Mercer, U.K. Patent No. 836,555. Other feed spacer materials include nylon, polysulfone and the like.

The permeate sweep spacer material 58 (FIG. 4A or 4C) is epoxy-coated simplex spacer. Simplex (or SIMPLEX ®) is an epoxy-coated simplex polyester fabric. A preferred spacer is available as simplex type S46E as epoxy (Hornwood Epoxy type HC-80) coated polyester in style numbers 7921, 9628, 9661, 9771 and 1271 commercially available from A. DiCenso Textiles, Inc., Annapolis, Md. 21401. This spacer is also used in reverse osmosis filtration cartridges.

The differential flow in the permeate (or feed passageway) may be obtained using multiple layers of spacer material. For instance, the distributor spacer material (Regions L and J, FIG. 5A) may be VEXAR ® 5321 in single or optionally multiple layers of spacer material (to make this region more porous) than are used in the active permeate spacer region K. Region J-K-L may also be on spacer grid material of substantially uniform porosity.

Other distributor spacer materials in the feed or permeate passageway include commercial CONWED ® spacer materials from CONWED ® Corp.

The adhesive to adhere the edges of the membrane to create the permeate passageway and to adhere the separator layer to pipe 51B may be the same or different. A single epoxy adhesive FULLER FE-7621 A and B is available from H. B. Fuller Co., Chicago, Ill.

The feed or permeate spacer materials are generally porous loosely knit organic materials. These include, for example, VEXAR ® 5321. VEXAR ® is useful as a permeate spacer at a feed pressure of up to about 30 psig. At high pressures, the permselective membrane usually collapses into the VEXAR ®. At these higher pressures, simplex described above is particularly useful. The central barrier (glue line 57A o 57B) can be of any suitable polymer, e.g., a polyurethane or an epoxide.

The module of the present invention can also be used for the removal of volatile organics or dissolved gases from water using a hydrophobic microporous membrane, e.g. polyolefins, polypropylene, such as CELGARD ® from Hoechst-Celanese Corp., Separation Products Division, Charlotte, N.C. Highly organic permeable membrane such as a silicone, available from General Electric Corp., Schenectady, N.Y., or Dow Corning Corporation of Midland, Mich. 48640.

The module can also be used to remove heavier hydrocarbons (C-2 to C-10 or greater) from natural gas using a membrane which is selective to these hydrocarbons or to methane. Silicone membranes are useful in this separation process which is commonly known as hydrocarbon dew pointing.

It is understood that the present invention is described in terms of sweep fluid being countercurrent or cocurrent. Countercurrent sweep flow is usually preferred. Of course, the direction of sweep fluid and of feed fluid ca both be reversed in the present invention with achievement of essentially the same good separation results.

The following Examples are for the purposes of explaining and defining the present invention. They are not to be construed as limiting in any manner.

EXAMPLE 1

FABRICATING THE SPIRAL-WOUND MODULE

Figure 5A:
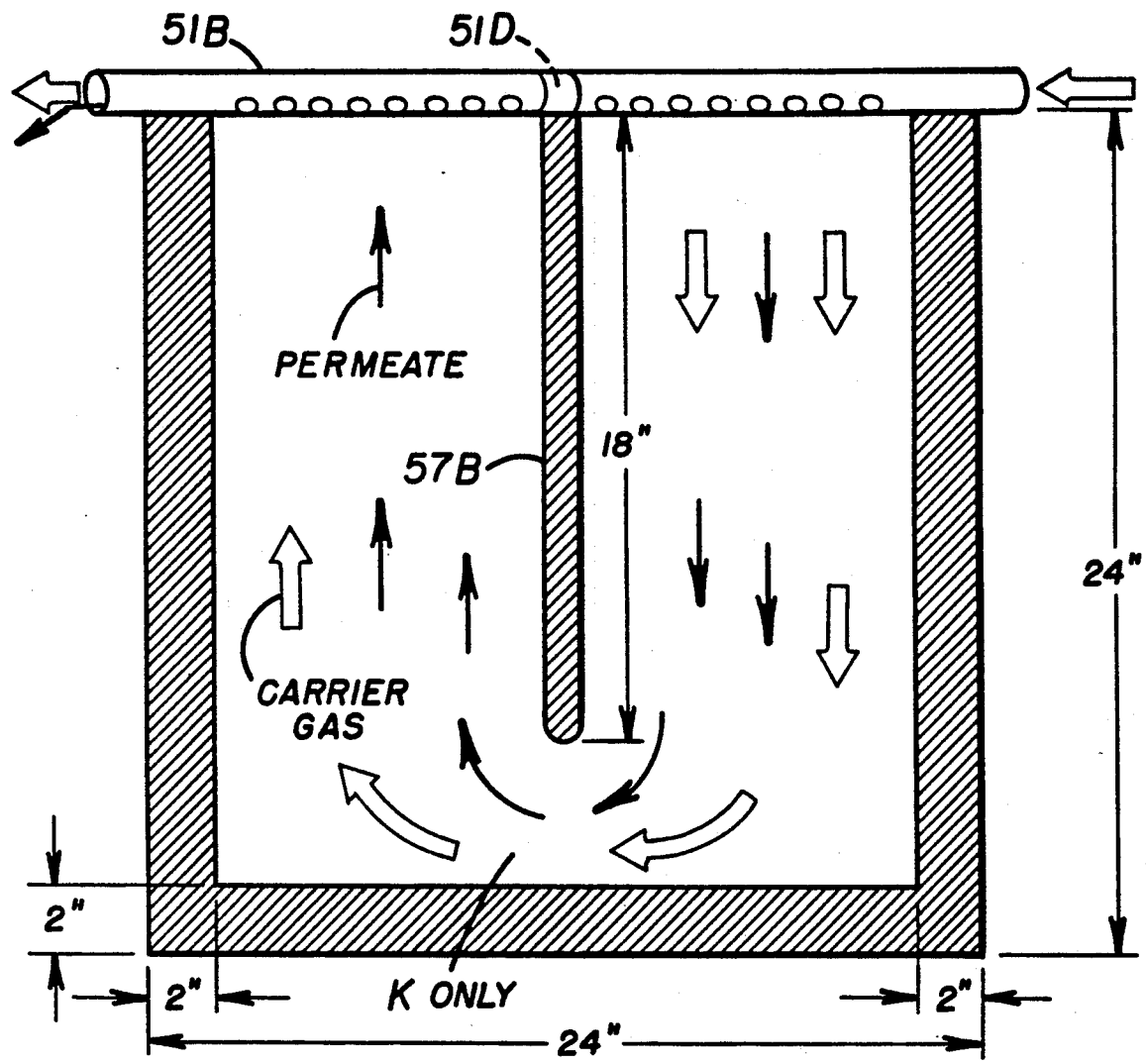
FIG. 5A is a schematic representation and dimensions of an open layup of the permeate pipe and permeate fluid passageway as described in Example 1.
Figure 5B:
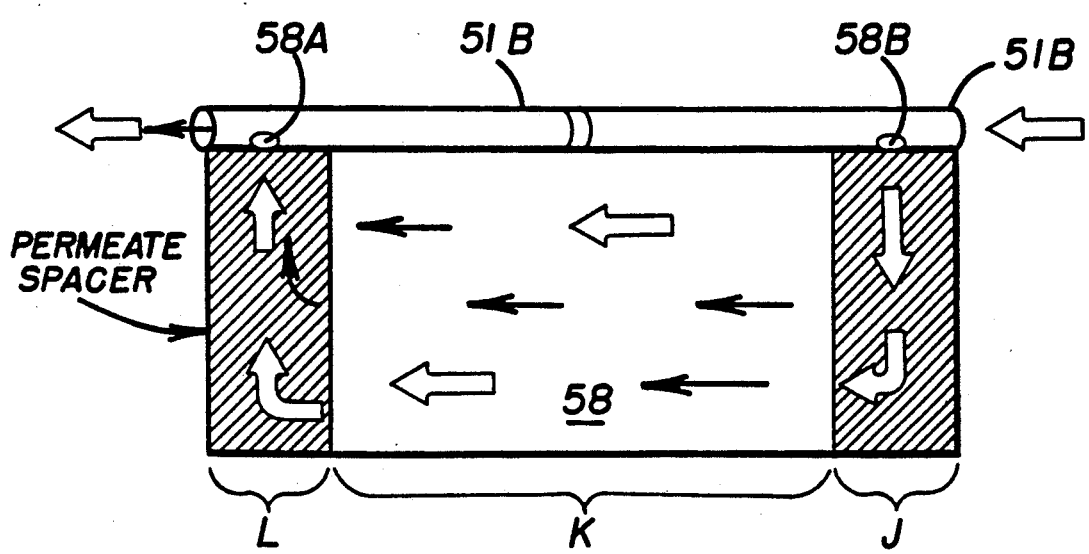
FIG. 5B is a schematic representation of an open layup of the pipe and the permeate (or countercurrent) fluid passageway using single or optionally multiple layers of spacer grid (or different spacer grids) to obtain differential flow of the permeate gas and countercurrent or cocurrent fluid across the permeate passageway.

A spiral-wound module is produced according to the description provided herein. The feed pipe and the permeate pipe 51B are each of 0.25 in O.D. copper, and 2.5 feet in length. The perm-selective feed membrane is 2 feet by 4 feet sheet of homogeneous polyperfluorosulfonic acid having a 5 mil. thickness prepared according to U.S. Pat. No. 4,846,977. The porous feed spacer is a 2 foot by 2 foot by 24 mil sheet of VEXAR 5321, (Conwed Corp., St. Paul, Minn. The feed pipe and spacer have a barrier, plug, adhesive edges, holes, etc. similar to the permeate passageway of FIG. 5A. FIG. 5A also includes pertinent dimensions and features.

The permeate spacer is a 2 foot by 2 foot by 24 mil sheet of VEXAR 5321. See FIG. 5A for the configuration of the permeate pipe, holes, barrier, spacer, adhesive, etc. The volume space filling means 52A and 52B are each cut to produce an outer convex surface having a diameter about 0.5 in., and the two inner concave diameters are each about 0.25 in. or larger. These volume space filling means are about 2 feet long.

The VEXAR spacer is wrapped once about feed pipe 51A, the space filling means of plastic epoxy polymer material is placed adjacent to the pipe 51A as shown on FIG. 5. This grouping is then placed within the loosely folded permselective membrane 54 to obtain two facing permselective surfaces of about 2 feet by 2 feet.

Next, the permeate pipe 51B is wrapped with one layer of the permeate spacer (simplex or VEXAR) 58 and space filling means 52B is placed adjacent to the wrapped pipe 51A as shown in FIG. 6. Assembly 50A and 50B are combined as shown in FIG. 5. All edges of the membrane are coated with polyurethane adhesive. Barriers 57A and 57B are created using a polyurethane adhesive line. The pendant membranes and spacer are then spirally wound producing the module of FIG. 7.

EXAMPLE 2

Air Dehydration

The module of Example 1 is connected to a moist air crude feed line 51A wherein the moist air has greater than 90% of saturation water content, and a pressure of 8 psig. A counter-current dry air (less than 0.01% water), at a rate of 0.0831 cfm is introduced in the permeate pipe at point 51E. No permeate exits at point 51E. The permeate gas exits at 51C with the counter-current gas 51F. The air feed exits having about 90% of the water removed. See Table 1.

TABLE 1

LOW PRESSURE PERFORMANCE EVALUATION - DRYING OF MOIST AIR PFSA (ACID FORM) SPIRAL WOUND MODULE

| Exp No. | Feed Press PSIA | Feed Flow cfm | Portg Ratio Feed/Sweep | PW In cm Hg | Pw Exptl Out cm Hg |
|---|---|---|---|---|---|
| 1 | 22.7 | 0.08480 | 0.980 | 1.7130 | 0.1319 |
| 2 | 22.9 | 0.08834 | 0.500 | 1.7126 | 0.0997 |
| 3 | 22.8 | 0.68550 | 1.386 | 1.4927 | 0.3305 |

TABLE 2

LOW PRESSURE PERFORMANCE EVALUATION - DRYING OF NATURAL GAS PFSA (ACID FORM) SPIRAL WOUND MODULE

| Exp No. | Feed Press PSIA | Feed Flow cfm | Portg Ratio Feed/Sweep | PW In cm Hg | Pw Exptl Out cm Hg |
|---|---|---|---|---|---|
| 1 | 22.9 | 0.25400 | 1.000 | 1.4196 | 0.1503 |
| 2 | 22.9 | 0.25300 | 0.503 | 1.4617 | 0.1256 |

Legend for Table 1 and 2
(Sweep gas exists at atmospheric pressure)
PSIA = pounds per square inch absolute
CFM = cubic feet per minute
cfm = 28.3 liters per minute
Feed/Sweep = flow rate of feed/flow rate of sweep gas
Pw in cm Hg = water vapor pressure on wet gas feed in centimers of mercury

EXAMPLE 3

Methane Gas Dehydration

The module of Example 1 connected to a methane gas line saturated with water at a pressure of about 8 psig. Counter-current dry methane (less than about 0.1 ppm water) is introduced in the permeate pipe at point 51E. No permeate gas exits at 51E. The permeate gas or vapor exits at point 51C with the counter-current gas. The exiting methane has about 90% of the water removed. See Table 2.

While only a few embodiments of the invention have been shown and described herein, it will become apparent to those skilled in the art that various modifications and changes can be made in the spiral wound membrane separation device (module) having a parallel positioned feed pipe and a permeate pipe collection means. This invention includes a module having entrance and exit means for a countercurrent sweep fluid of the permeate without departing from the spirit and scope of the present invention. All such modifications and changes coming within the scope of the appended claims are intended to be carried out thereby.

We claim:

1. A spiral wound membrane module having a semipermeable membrane for use in the separation of a permeate from a fluid feed mixture, said module comprising:

a centrally located feed pipe, at least one permselective membrane envelope, having within the fold at least one feed spacer means for controlling the feed flow in the feed passageway, a centrally located permeate pipe which is generally parallel to the feed pipe, at least one permeate spacer means for controlling the permeate flow in the permeate passageway and optionally for controlling the flow of a countercurrent or cocurrent fluid in the permeate, and first and second volume space filling means for obtaining a substantially circular outer surface of the module, wherein the generally hollow feed pipe has a wall barrier intermediate in its length dividing the pipe into a first compartment and a second compartment, the feed pipe having means for introducing a fluid feed stream to the first compartment of the pipe and means for removing the more concentrate (feed) effluent fluid from the second compartment of the pipe, the first and second feed pipe compartments each having at least one axial opening through the pipe circumference through which the feed fluid will pass, the porous feed spacer means are in fluid communication with the axial openings of the first and second feed pipe compartments, the membrane envelope comprises a sheet membrane having a first surface and a second surface which is opposite to the first surface, wherein the membrane is generally folded once around the hollow feed pipe at the fold so that a first half of the first surface of the membrane layer faces the other half of the first surface of the membrane envelope creating a feed passageway and interposed between the first and second surfaces of the membrane is the porous fluid feed spacer means for controlling the flow of fluid in the feed passageway, the permeate passageway for the fluid permeate is formed by the adjacent second membrane surfaces which are opposite to the first membrane surface, wherein the permeate passageway has porous permeate spacer means which control the flow of fluid in the permeate passageway and, if present, the flow of a countercurrent or cocurrent fluid in the permeate passageway between the adjacent second membrane envelope surfaces which are opposite to the first membrane surface, the generally hollow permeate pipe is in the permeate passageway adjacent to and generally parallel with the feed pipe, the permeate pipe having a wall barrier intermediate in its length dividing the permeate pipe into a first permeate compartment and a second permeate compartment, the permeate pipe having means for removing the permeate from the first and second permeate compartments, where the first and second permeate pipe compartments each have at least one axial opening through the permeate pipe circumference through which the permeate fluid passes, and the permeate passageway is in fluid communication with the axial fluid openings of the first and second permeate pipe compartments, first volume space filling means (52A) to obtain a circular shape, adjacent to and in contact with the curved longitudinal outer surface of up to about one wrapping of the porous feed spacer means about the feed pipe and also in contact with the outer surface of about one layer of the porous permeate spacer means about the permeate pipe, second volume space filling means adjacent to and in contact with about one wrapping of the permeate spacer means about the permeate pipe and in contact with the outer surface of about one layer of the porous spacer means about the feed pipe wherein both volume space filling means each have an outer larger generally arcuate convex surface wherein the larger surface arc is slightly larger in diameter than the sum of the diameters of the feed pipe and the permeate pipe, and a smaller first and a smaller second inner concave intersecting arcuate surfaces which intersect each other and the outer edge of the larger arc to define a linear three dimensional volume having three curved surfaces and two generally perpendicular end surfaces, wherein the smaller inner arcuate surfaces are about the same diameter and shape of the feed pipe and permeate pipe and the two inner concave surfaces of the space filling means are in contact with the adjacent convex outer surface of the porous feed spacer means about the feed pipe and the convex outer surface of the porous permeate spacer means surrounding the permeate pipe, wherein the first and second volume space filling means, when placed in contact with the porous spacer means surrounding the feed pipe and the porous spacer means about the permeate pipe, together form a substantially circular outer surface about which the feed membrane and permeate spacer means are spirally wrapped in alternating layers, means to seal the edges of the membranes of the module to contain the fluids therein, and means for removal of permeate fluid from the fluid permeate passageway to the exterior of the module, and means for restraining the unspiraling of the compact module roll under operational conditions.

2. The module of claim 1 which is contained in a casing having means to collect and remove the fluid permeate.

3. The module of claim 1 wherein said hollow permeate pipe further includes means for injecting cocurrent or countercurrent fluid in the second compartment of the permeate pipe; and means for removing the cocurrent or countercurrent fluid from the other compartment of the permeate pipe wherein the permeate stream is removed.

4. The module of claim 1 wherein the membranes for the module are sealed at the edges to contain all fluids within the module.

5. The module of claim 4 wherein the operating pressure is between about 15 and 2500 psig.

6. The module of claim 5 for up to about 10° C. less than the lowest glass transition temperature of the membrane, feed spacer, permeate spacer, volume space means, pipe, plug or adhesive.

7. The module of claim 5 wherein the permselective membrane is selected from cellulose triacetate, or polyperfluorosulfonic acid.

8. The module of claim 7 wherein the permeate spacer and feed spacer are each selected from a microporous high density or low density polypropylene membrane support material or an epoxy coated microporous polyester fabric spacer.

9. The module of claim 8 wherein the feed pipe and permeate pipe are independently selected from copper, steel, aluminum, or poly(carbonate).

10. The module of claim 9 wherein the adhesives used to seal the pipes or edges of the membranes is independently selected from polyurethane, epoxide, copper, steel or aluminum.

11. The spiral wound membrane separation module of claim 1 wherein in said feed channel within the module the feed spacer means to control the flow of the feed comprises three juxtapositioned regions X-Y-Z wherein region X-Y and region Y-Z are in fluid communication with each other through region Y, and X-Y and Y-Z are separated by two series of adhesive spots in a predetermined configuration generally in a straight line generally perpendicular to the curved surface of the pipe, in said permeate passageway said permeate spacer means to control the flow of the permeate and the cross-current sweep fluid comprises three juxtapositioned fluid connected regions Q-R-S wherein region Q and R and region R and S each have one edge immediately adjacent to said pipe and the boundary between region Q and R and region R and S are a series of adhesive spots in a predetermined configuration, both lines of spots generally in a straight line axial to the curved surface of the pipe to the outer edge of the module membrane.

12. The spiral wound membrane separation module of claim 1 wherein said permeate spacer means to control the flow of permeate and cocurrent or countercurrent sweep fluid comprise three juxtpositioned fluid interconnected regions Q-R-S wherein the boundaries between region Q and R and region R and S are two liens of separated adhesive spots in a predetermined configuration both lines of spots generally in a straight line axially from the curved surface of the pipe to the outer edge of the module membrane.

13. A membrane separation device which device comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral wound module and the interior wall of the housing the spiral-wound membrane module being designed to separate the fluid feed stream into a permeate stream and a concentrate stream, (c) means to completely seal the annular clearance space between the exterior surface of the module and the interior surface of the housing creating a first chamber and a second chamber, (d) means to introduce a feed stream axially to the spiral-wound membrane module in said first chamber means to withdraw a concentrate stream from said second chamber, and (e) means to withdraw a permeate stream, wherein said spiral wound membrane module comprises:

a centrally located feed pipe, at least one permselective membrane envelope, having within the fold at least one feed spacer means for controlling the feed flow in the feed passageway, a centrally located permeate pipe which is generally parallel to the feed pipe, at least one permeate spacer means for controlling the permeate flow in the permeate passageway and optionally for controlling the flow of a countercurrent or cocurrent fluid in the permeate, and first and second volume space filling means for obtaining a substantially circular outer surface of the module, wherein the generally hollow feed pipe has a wall barrier intermediate in its length dividing the pipe into a first compartment and a second compartment, the feed pipe having means for introducing a fluid feed stream to the first compartment of the pipe and means for removing the more concentrate (feed) effluent fluid from the second compartment of the pipe, the first and second feed pipe compartments each having at least one axial opening through the pipe circumference through which the feed fluid will pass, the porous feed spacer means are in fluid communication with the axial openings of the first and second feed pipe compartments, the membrane envelope comprises a sheet membrane having a first surface and a second surface which is opposite to the first surface, wherein the membrane is generally folded once around the hollow feed pipe at the fold so that a first half of the first surface of the membrane layer faces the other half of the first surface of the membrane envelope creating a feed passageway and interposed between the first and second surfaces of the membrane is the porous fluid feed spacer means for controlling the flow of fluid in the feed passageway, the permeate passageway for the fluid permeate is formed by the adjacent second membrane surfaces which are opposite to the first membrane surface, wherein the permeate passageway has porous permeate spacer means which control the flow of fluid in the permeate passageway and, optionally, the flow of a countercurrent or cocurrent fluid in the permeate passageway between the adjacent second membrane envelope surfaces which are opposite to the first membrane surface, the generally hollow permeate pipe is in the permeate passageway adjacent to and generally parallel with the feed pipe, the permeate pipe having a wall barrier intermediate in its length dividing the permeate pipe into a first permeate compartment and a second permeate compartment, the permeate pipe having means for removing the permeate from the first and second permeate compartments, where the first and second permeate pipe compartments each have at least one axial opening through the permeate pipe circumference through which the permeate fluid passes, and the permeate passageway is in fluid communication with the axial fluid openings of the first and second permeate pipe compartments, first volume space filling means to obtain a circular shape, adjacent to and in contact with the curved longitudinal outer surface of up to about one wrapping of the porous feed spacer means about the feed pipe and also in contact with the outer surface of about one layer of the porous permeate spacer means about the permeate pipe, second volume space filling means adjacent to and in contact with about one wrapping of the permeate spacer means about the permeate pipe and in contact with the outer surface of about one layer of the porous spacer means about the feed pipe wherein both volume space filling means each have an outer larger generally arcuate convex surface wherein the larger surface arc is slightly larger in diameter than the sum of the diameters of the feed pipe and the permeate pipe, and a smaller first and a smaller second inner concave intersecting arcuate surfaces which intersect each other and the outer edge of the larger arc to define a linear three dimensional volume having three curved surfaces and two generally perpendicular end surfaces, wherein the smaller inner arcuate surfaces are about the same diameter and shape of the feed pipe and permeate pipe and the two inner concave surfaces of the space filling means are in contact with the adjacent convex outer surface of the porous feed spacer means about the feed pipe and the convex outer surface of the porous permeate spacer means surrounding the permeate pipe, wherein the first and second volume space filling means, when placed in contact with the porous spacer means surrounding the feed pipe and the porous spacer means about the permeate pipe, together form a substantially circular outer surface about which the feed membrane and permeate spacer means are spirally wrapped in alternating layers, means to seal the edges of the membranes of the module to contain the fluids therein, and means for removal of permeate fluid from the fluid permeate passageway to the exterior of the module, and means for restraining the unspiraling of the compact module roll under operational conditions.

14. The membrane separation device of claim 13 wherein said hollow permeate pipe further includes means for injecting a cocurrent or a countercurrent fluid in one compartment of the pipe for transmission through the permeate passageway; and means for removing the cocurrent or countercurrent sweep fluid and permeate from the other compartment of the permeate pipe.

15. The membrane separation device of claim 14 wherein said permeate passageway comprising three juxtapositioned interconnected regions J-K-L wherein the outer higher porosity region J and outer higher porosity region L are each in fluid communication on one edge to the pipe axial openings and a second axial side of region J and a second axial side of region L are each connected to opposing sides of lower porosity region K, wherein region J axially receives the permeate at low pressure.

16. The membrane separation device of claim 14 wherein in the permeate passageway the permeate spacer means comprise a higher porosity region Q and lower porosity region R, and higher porosity region S are each defined on their common edges by two lines of spaced glue tabs in a predetermined configuration generally axial to the pipe.

* * * * *

UNITED STATES PATENT AND TRADEMARK OFFICE
CERTIFICATE OF CORRECTION

PATENT NO. : 5,034,126

DATED : July 23, 1991

INVENTOR(S) : Damoder Reddy, et al

It is certified that error appears in the above-identified patent and that said Letters Patent is hereby corrected as shown below:

Col. 22, line 54, after "receives the permeate at low pressure", insert -- which region is in fluid communication with the lower porosity (high pressure region) K in fluid communication with low pressure region L wherein region K is not directly in fluid communication with any axial opening of the first and second compartments of the pipe. --.

Signed and Sealed this

Twenty-second Day of December, 1992

Attest:

DOUGLAS B. COMER

*Attesting Officer*     *Acting Commissioner of Patents and Trademarks*